United States Patent
Kojima et al.

(10) Patent No.: US 12,007,756 B2
(45) Date of Patent: Jun. 11, 2024

(54) MACHINING ASSIST SYSTEM AND CUTTING APPARATUS

(71) Applicant: JTEKT Corporation, Osaka (JP)

(72) Inventors: Hiroshi Kojima, Kariya (JP); Yoshihiko Yamada, Anjo (JP); Takayuki Azuma, Anjo (JP); Toshiki Sakai, Kariya (JP); Shigetoshi Noritake, Nagakute (JP); Kazunari Teramoto, Nagakute (JP)

(73) Assignee: JTEKT Corporation, Kariya (JP)

( * ) Notice: Subject to any disclaimer, the term of this patent is extended or adjusted under 35 U.S.C. 154(b) by 442 days.

(21) Appl. No.: 16/579,982

(22) Filed: Sep. 24, 2019

(65) Prior Publication Data

US 2020/0103868 A1   Apr. 2, 2020

(30) Foreign Application Priority Data

Sep. 27, 2018 (JP) ................................ 2018-182668

(51) Int. Cl.
*G05B 19/418* (2006.01)
*G05B 13/02* (2006.01)
(Continued)

(52) U.S. Cl.
CPC ....... *G05B 19/4187* (2013.01); *G05B 13/028* (2013.01); *G05B 19/4065* (2013.01);
(Continued)

(58) Field of Classification Search
CPC .............. G05B 19/4187; G05B 13/028; G05B 19/4065; G05B 2219/32128;
(Continued)

(56) References Cited

U.S. PATENT DOCUMENTS 5,127,005 A   6/1992 Oda et al.
7,412,296 B2 *  8/2008 Yamaguchi ........ G05B 19/4097
                                                    700/98
(Continued)

FOREIGN PATENT DOCUMENTS

CN   106457408 A   2/2017
JP   03-108030 A   5/1991
(Continued)

OTHER PUBLICATIONS

Notice of Reasons for the Rejection dated May 31, 2022 in Japanese Patent Application No. 2018-182668 (with English language translation), 7 pages.
(Continued)

*Primary Examiner* — Darrin D Dunn
*Assistant Examiner* — Olvin Lopez Alvarez
(74) *Attorney, Agent, or Firm* — Oblon, McClelland, Maier & Neustadt, L.L.P.

(57) ABSTRACT

A machining assist system includes a knowledge database, a receiver, a control unit, and a display. The knowledge database stores various pieces of information indicative of know-how concerning a machining method and a machining facility. The receiver receives a question. The control unit executes a driving solver and a solution-providing solver so as to search the knowledge database using a search condition based on the question and derive a response. The display presents the response. The response includes a plurality of measures, priorities assigned to the measures, and progress information indicative of a search process and a search route. The search process includes a plurality of factors to be used to derive the measures. The search route is a link between the factors. The search process and the search route are visually presented on the display.

9 Claims, 9 Drawing Sheets

(51) Int. Cl.
  *G05B 19/4065* (2006.01)
  *B23Q 17/09* (2006.01)
  *G06F 16/90* (2019.01)

(52) U.S. Cl.
  CPC .............. *B23Q 17/0995* (2013.01); *G05B 2219/32128* (2013.01); *G05B 2219/37355* (2013.01); *G06F 16/90* (2019.01)

(58) Field of Classification Search
  CPC ........... G05B 2219/37355; G05B 2219/32001; G05B 2219/35494; G05B 19/409; B23Q 17/0995; G06F 16/90
  See application file for complete search history.

(56) References Cited

U.S. PATENT DOCUMENTS

| | | | | |
|---|---|---|---|---|
| 10,871,764 | B2* | 12/2020 | Nordell | G05B 19/4099 |
| 11,009,850 | B2* | 5/2021 | Nagatomo | G05B 19/409 |
| 2002/0046028 | A1* | 4/2002 | Saito | G10L 15/1815 |
| | | | | 704/E15.024 |
| 2003/0140037 | A1* | 7/2003 | Deh-Lee | G06F 16/93 |
| 2013/0028673 | A1* | 1/2013 | Onishi | B23Q 11/0007 |
| | | | | 408/8 |
| 2013/0268110 | A1* | 10/2013 | Hamada | G05B 19/404 |
| | | | | 700/192 |
| 2014/0207271 | A1* | 7/2014 | Tsai | G05B 19/4065 |
| | | | | 700/121 |
| 2016/0092412 | A1* | 3/2016 | Seki | G06V 30/412 |
| | | | | 715/256 |
| 2018/0010986 | A1* | 1/2018 | Matsuo | G06Q 30/016 |
| 2018/0067471 | A1* | 3/2018 | Saitou | G05B 19/4065 |
| 2018/0341244 | A1* | 11/2018 | Xu | G05B 19/4163 |
| 2019/0113901 | A1* | 4/2019 | Morisaki | G05B 19/0426 |
| 2019/0310620 | A1* | 10/2019 | Kamiguti | G05B 23/0221 |
| 2022/0043702 | A1* | 2/2022 | Haines | G06F 11/32 |

FOREIGN PATENT DOCUMENTS

| | | | | |
|---|---|---|---|---|
| JP | 5-289903 | A | | 11/1993 |
| JP | H10-319180 | A | | 12/1998 |
| JP | 2007-241774 | A | | 9/2007 |
| JP | 2007-241861 | A | | 9/2007 |
| JP | 2009-087242 | A | | 4/2009 |
| JP | 2009282909 | | * 12/2009 | ............ G05B 19/18 |
| JP | 2013196422 | | * 9/2013 | ............ G06F 21/45 |
| JP | 2018097569 | A | * 6/2018 | ............ G06F 17/30 |
| JP | 2018147351 | | * 9/2018 | ............ G06F 17/30 |
| WO | 2018/047313 | A1 | | 3/2018 |

OTHER PUBLICATIONS

Office Action dated Nov. 29, 2022 in counterpart Japanese Patent Application No. 2018-182668, along with and English translation.
Office Action dated Sep. 22, 2023 in Chinese Patent Application No. 2019109228711, (English translation only).

* cited by examiner

FIG. 10

SUGGESTIONS FOR
REMEDIAL MEASURES

■MEASURES
1. MACHINING CONDITION : REDUCE CUTTING DEPTH BY X PERCENT
2. MACHINING CONDITION : REDUCE FEED RATE BY Y PERCENT
3. TOOL CONDITION : CHANGE TOOL MATERIAL TO MATERIAL B

<PRECAUTIONS>
· IS COOLANT APPLIED TO MACHINING POINT?
· IS WORKPIECE SECURED FIRMLY?

MACHINING ASSIST SYSTEM AND CUTTING APPARATUS

INCORPORATION BY REFERENCE

The disclosure of Japanese Patent Application No. 2018-182668 filed on Sep. 27, 2018, including the specification, drawings and abstract, is incorporated herein by reference in its entirety.

BACKGROUND OF THE INVENTION

1. Field of the Invention

The invention relates generally to machining assist systems and cutting apparatuses. More particularly, the invention relates to a machining assist system to assist operations involved in machining and a cutting apparatus including the machining assist system.

2. Description of the Related Art

One example known in the related art is a fault diagnostic expert system disclosed in Japanese Unexamined Patent Application Publication No. 3-108030 (JP 3-108030 A). The fault diagnostic expert system known in the related art includes a memory and an estimator. The fault diagnostic expert system adds cause candidate conditions to expert knowledge stored in the memory. The cause candidate conditions are used to limit a search route or perform pruning for a causal chain tree. When estimating a cause, the estimator determines whether an estimated cause has followed an event indicated by a condition included in the cause candidate conditions. The fault diagnostic expert system thus determines a cause candidate.

Another example known in the related art is an expertise and know-how systematization assist apparatus disclosed in Japanese Unexamined Patent Application Publication No. 2007-241774 (JP 2007-241774 A). The systematization assist apparatus known in the related art includes a product and process model database (DB) that stores an integrated model. The integrated model includes a product structural information model and a process structural information model that are integrated with each other. On the basis of the integrated model, the systematization assist apparatus conducts not only modeling of trouble in a product design model but also modeling of trouble in production preparation and manufacture. On the basis of the integrated model, the systematization assist apparatus known in the related art stores an entity and state data model in a quality knowledge database (DB). The entity and state data model represents each of an entity and a state by an attribute and a method. This makes it possible to systematically describe expertise and know-how concerning a production system.

Still another example known in the related art is a causal event occurrence probability (contribution ratio) calculating apparatus disclosed in Japanese Unexamined Patent Application Publication No. 2007-241861 (JP 2007-241861 A). The causal event occurrence probability (contribution ratio) calculating apparatus known in the related art calculates an event occurrence probability (contribution ratio) in accordance with fault tree analysis (FTA) information. The FTA information is provided by arranging an event in each portion of a tree structure via a logic gate. The calculating apparatus includes a calculator to calculate a ratio of contribution of a causal event to a resulting event.

Unfortunately, the system and apparatuses known in the related art indicate (or suggest) measures to solve conceivable problems but do not necessarily indicate (or suggest) effective measures to solve unexpected problems that have actually occurred. In the event of an unexpected problem, an unskilled worker who lacks experience in machining, in particular, faces the difficulty of solving the problem that has actually occurred. In such a case, the unskilled worker usually asks a skilled worker who has abundant experience in machining to solve the problem that has occurred. This makes it necessary for the skilled worker to temporarily stop his or her operation so as to solve the problem that has occurred. Such an approach, however, may lead to reduced productivity. In addition, retirement of the skilled worker makes it difficult to pass valuable know-how (such as expertise, knowledge, experience, and ways of thinking that the skilled worker has accumulated over the years) on to the unskilled worker.

SUMMARY OF THE INVENTION

An aspect of the invention provides a machining assist system including a database, an acquirer, a question receiver, a control unit, and a display. The database stores various pieces of information indicative of know-how concerning a machining method and a machining facility. The various pieces of information are stored in a searchable and updatable manner. The acquirer acquires machining result information indicative of a machining result of machining performed on a workpiece. The question receiver receives a question about the machining method and the machining facility in accordance with the machining result information acquired by the acquirer. The control unit executes a solver to search the database by setting a search condition based on at least the question received by the question receiver and derive a solution responsive to the search condition. The solution is a response to the question. The display presents the response acquired in response to the execution of the solver by the control unit. The response presented on the display includes a plurality of measures, a certainty factor of each of the measures, and progress information. The measures are each related to an answer to the question. The certainty factor of each of the measures is indicative of a likelihood of providing an answer to the question. The progress information is indicative of a search process and a search route. The search process includes a plurality of factors for which the solver searches the database so as to derive the measures in a form of the solution. The search route indicates a correlation between the factors included in the search process. The search process and the search route are visually presented.

Another aspect of the invention provides a cutting apparatus including the machining assist system, a tool retainer, a workpiece retainer, a workpiece conveyor, a tool mover, and a controller. The tool retainer retains a tool including a cutting edge. The workpiece retainer retains the workpiece. The workpiece conveyor conveys the workpiece retained by the workpiece retainer in a predetermined direction. The tool mover moves the tool relative to the workpiece. The controller controls operation of the tool mover.

Upon receiving the question concerning the machining method (e.g., a cutting method) and the machining facility (e.g., the cutting apparatus) through the question receiver, the control unit of the machining assist system according to the above aspects is able to search the database (in which the various pieces of information indicative of know-how are stored in an searchable and updatable manner) using the search condition based on the question received. The control unit is able to present, on the display, the measures each related to an answer to the question, the certainty factor of each of the measures, and the progress information indicative of the search process (including the factors) and the search route (indicating the correlation between the factors), such that the measures, the certainty factor, and the progress information are indicated to an unskilled worker.

The above aspects enable, for example, an unskilled worker who lacks expertise (or knowledge) and experience in machining (or cutting) to find an answer to the question (or problem) concerning the machining method (or cutting method) and the machining facility (e.g., the cutting apparatus) in accordance with the response indicated to the unskilled worker. This reduces the frequency of asking a skilled worker for help and accordingly reduces the frequency of interrupting the work of the skilled worker. Consequently, the above aspects prevent or limit a reduction in productivity of the skilled worker.

The various pieces of information are stored in the database in the form of the know-how acquired by the skilled worker who has abundant expertise (or knowledge) and experience in machining (or cutting). Thus, if the skilled worker retires, his or her valuable know-how would be permanently storable and usable. This makes it possible to continuously pass the valuable know-how on to workers of the next generation. The response indicated to the unskilled worker includes the progress information. The unskilled worker is thus able to learn the factors for acquiring the measures indicated and the correlation between the factors (i.e., ways of thinking in factorial analysis).

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 10 is a chart describing measures included in the response generated by the control unit illustrated in FIG. 4.

DETAILED DESCRIPTION OF EMBODIMENTS

A machining assist system according to an embodiment of the invention will be described below with reference to the drawings. The present embodiment will be described on the assumption that the machining assist system is included in a cutting apparatus 1 to carry out cutting that is one of machining processes.

Figure 1:
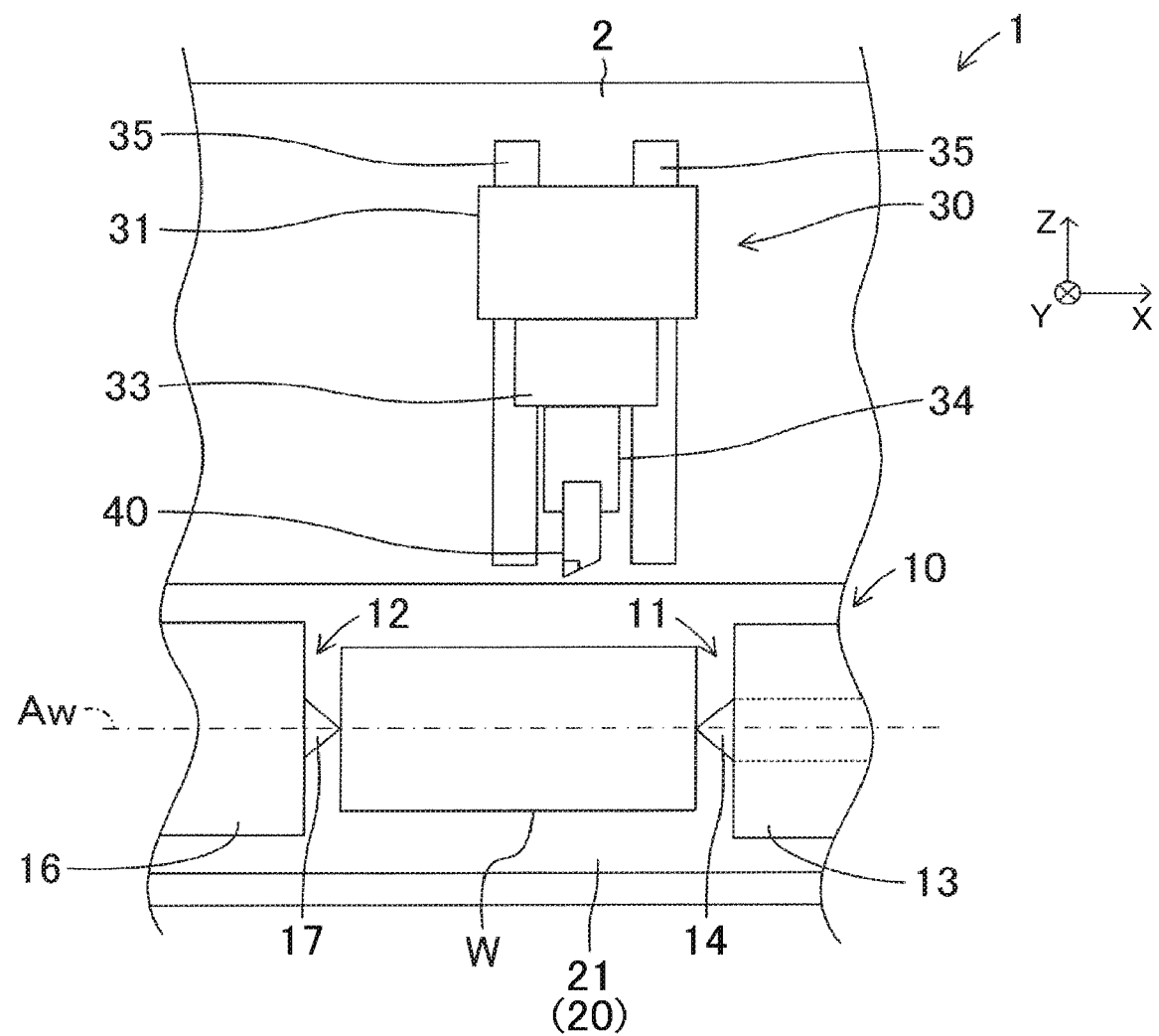
FIG. 1 a plan view of an overall structure of a cutting apparatus according to an embodiment of the invention.

As illustrated in FIG. 1, the cutting apparatus 1 is a lathe. The cutting apparatus 1 includes a workpiece retainer 10, a workpiece conveyor 20, a tool retainer 30, a cutting tool 40 (which is a tool), and a controller 100.

The workpiece retainer 10 retains a workpiece W such that the workpiece W is rotatable. The workpiece W has, for example, a simple cylindrical shape. The workpiece retainer 10 includes a headstock 11 and a tailstock 12. The headstock 11 includes a headstock body 13, a rotative spindle 14, and a rotative spindle motor 15 (see FIG. 3). The headstock body 13 is a housing. The rotative spindle 14 is rotatably supported by the headstock body 13. The rotative spindle 14 supports a first end of the workpiece W facing in a first direction extending along a rotation axis Aw of the workpiece W, such that the workpiece W is rotatable. In FIG. 1, the first end of the workpiece W is the right end of the workpiece W. The rotative spindle motor 15 provides a driving force to rotate the rotative spindle 14. The tailstock 12 includes a tailstock body 16 and a tailstock center 17. The tailstock body 16 is a housing. The tailstock center 17 supports a second end of the workpiece W facing in a second direction extending along the rotation axis Aw of the workpiece W, such that the workpiece W is rotatable. In FIG. 1, the second end of the workpiece W is the left end of the workpiece W.

With the rotation axis Aw of the workpiece W in parallel with an X-axis direction, the workpiece retainer 10 supports the first and second ends of the workpiece W (that respectively face in the first and second directions extending along the rotation axis Aw) with the rotative spindle 14 and the tailstock center 17. Driving the rotative spindle motor 15 rotates the workpiece W around the rotation axis Aw.

Figure 2:
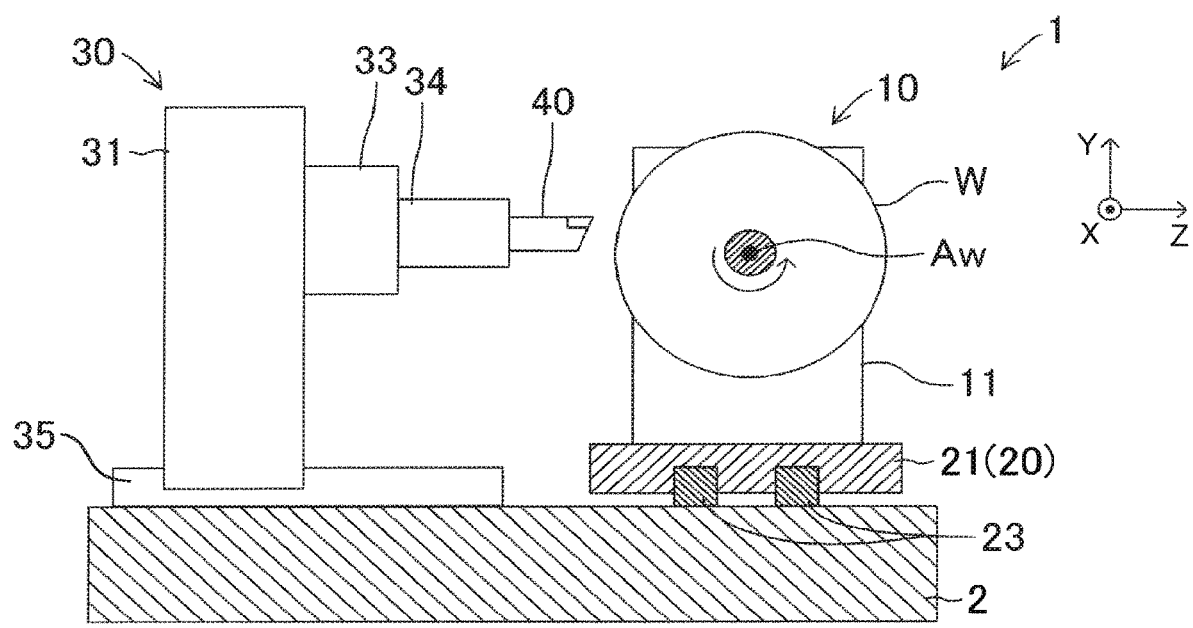
FIG. 2 is a cross-sectional view of the cutting apparatus.

The workpiece conveyor 20 conveys the workpiece W in the X-axis direction. The X-axis direction is a predetermined direction. The workpiece conveyor 20 includes a conveying table 21 and an X-axis driver 22 (see FIG. 3). The X-axis driver 22 is not illustrated in FIG. 1 or FIG. 2. The conveying table 21 is movable over the upper surface of a bed 2 in the X-axis direction. Specifically, as illustrated in FIG. 2, the upper surface of the bed 2 is provided with a pair of X-axis guide rails 23 extending in the X-axis direction. The conveying table 21 is disposed on the X-axis guide rails 23 such that the conveying table 21 is movable in the X-axis direction while being guided by the X-axis guide rails 23. The X-axis driver 22 is a screw conveyor to convey the conveying table 21 relative to the bed 2 in the X-axis direction (i.e., along the rotation axis Aw of the workpiece W).

The headstock 11 and the tailstock 12 are disposed on the upper surface of the conveying table 21. Driving the X-axis driver 22 moves the conveying table 21 in the X-axis direction. The workpiece W supported by the headstock 11 and the tailstock 12 is thus conveyed along the rotation axis Aw of the workpiece W.

The tool retainer 30 retains the cutting tool 40 (which is a tool) such that the cutting tool 40 is non-rotatable. The tool retainer 30 includes a column 31, a Z-axis driver 32 (see FIG. 3), a saddle 33, and a holder 34. The Z-axis driver 32 functions as a tool mover. The Z-axis driver 32 is not illustrated in FIG. 1 or FIG. 2.

The column 31 is movable over the upper surface of the bed 2 in the Z-axis direction. Specifically, the upper surface of the bed 2 is provided with a pair of Z-axis guide rails 35 extending in the Z-axis direction. The column 31 is disposed on the Z-axis guide rails 35 such that the column 31 is movable in the Z-axis direction while being guided by the Z-axis guide rails 35. The Z-axis driver 32 is a screw conveyor to convey the column 31 relative to the bed 2 in the Z-axis direction.

The holder 34 is secured to the saddle 33. The holder 34 holds the cutting tool 40 such that the cutting tool 40 is detachable from the holder 34. The cutting tool 40 held by the holder 34 is thus moved in parallel with the bed 2 in the Z-axis direction in accordance with the movement of the column 31 and the saddle 33. The Z-axis direction is perpendicular or substantially perpendicular to the X-axis direction that corresponds to a conveying direction.

Figure 3:
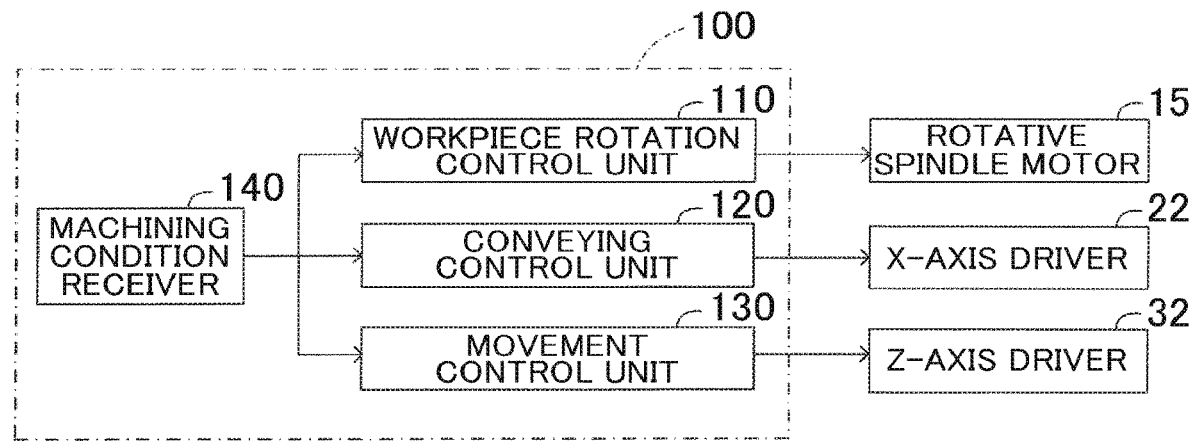
FIG. 3 is a block diagram of a controller.

As illustrated in FIG. 3, the controller 100 includes a workpiece rotation control unit 110, a conveying control unit 120, a movement control unit 130, and a machining condition receiver 140. The workpiece rotation control unit 110 controls driving of the rotative spindle motor 15 so as to rotate the workpiece W supported by the rotative spindle 14 and the tailstock center 17.

The conveying control unit 120 controls driving of the X-axis driver 22 so as to move the conveying table 21 in the X-axis direction. The workpiece W retained by the workpiece retainer 10 is thus conveyed in the X-axis direction. The movement control unit 130 controls driving of the Z-axis driver 32. The cutting tool 40 attached to the tool retainer 30 is thus moved in parallel with the bed 2 in the Z-axis direction.

The machining condition receiver 140 is operated by a worker. The worker enters machining conditions for cutting the workpiece W into the machining condition receiver 140. Specifically, the machining condition receiver 140 receives various cutting-related machining conditions, such as a distance by which the cutting tool 40 (or the holder 34) is to be moved in the Z-axis direction, a speed of conveyance of the workpiece W relative to the cutting tool 40 in the X-axis direction, a cutting speed, a cutting depth, and a material for the workpiece W. The machining condition receiver 140 is connected to the workpiece rotation control unit 110, the conveying control unit 120, and the movement control unit 130. The machining condition receiver 140 outputs the machining conditions, entered by the worker, to the workpiece rotation control unit 110, the conveying control unit 120, and the movement control unit 130.

The following description discusses a machining assist system 200 to assist cutting (or machining) carried out using the cutting apparatus 1 (which may be a machining facility). The machining assist system 200 provides various pieces of information indicative of know-how concerning cutting (or machining) to a worker who operates the cutting apparatus 1. The various pieces of information indicative of the know-how are based on expertise (or knowledge) and experience acquired by a skilled worker who has abundant experience in cutting that involves using the cutting apparatus 1. The worker who operates the cutting apparatus 1 is, for example, an unskilled worker who has not much experience in cutting that involves using the cutting apparatus 1. The machining assist system 200 thus assists cutting that involves using the cutting apparatus 1 operated by the unskilled worker.

Figure 4:
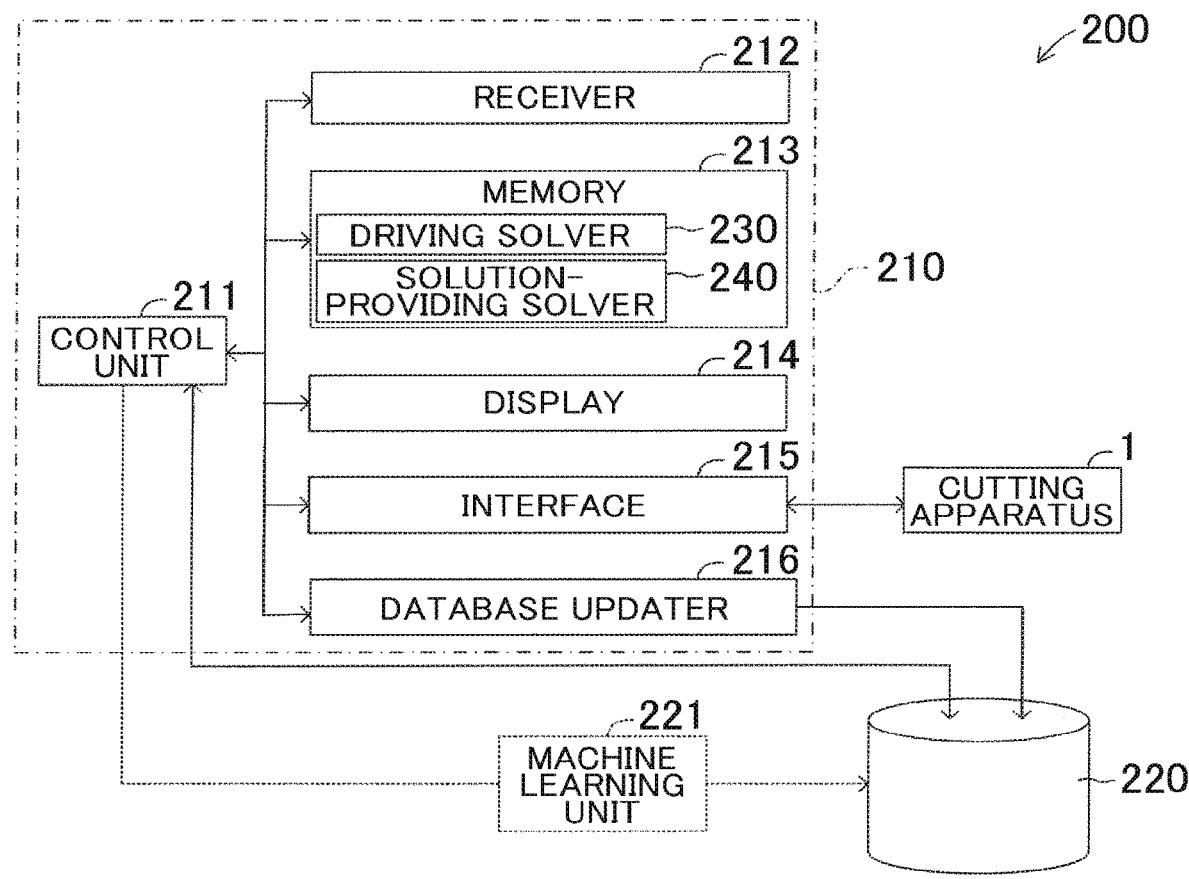
FIG. 4 is a block diagram of a machining assist system.

As illustrated in FIG. 4, the machining assist system 200 includes a personal computer 210 and a knowledge database 220. The knowledge database 220 is used to find factor(s) for a task (or a problem) that has occurred during machining. The machining assist system 200 according to the present embodiment further includes a solver. The solver includes a driving solver 230 and a solution-providing solver 240. The driving solver 230 is a first solver to be executed by the personal computer 210. The solution-providing solver 240 is a second solver to be executed by the personal computer 210.

As illustrated in FIG. 4, the personal computer 210 includes a control unit 211. Main components of the control unit 211 include a central processing unit (CPU), a read-only memory (ROM), and a random-access memory (RAM). The control unit 211 exercises centralized control over operations of the machining assist system 200. To exercise this control, the control unit 211 is communicably connected with a receiver 212, a memory 213, a display 214, an interface 215, and a database updater 216.

The receiver 212 functions as a question receiver and an acquirer. The receiver 212 includes a keyboard and a microphone. The receiver 212 is operated mainly by the unskilled worker such that the receiver 212 receives a question concerning a cutting method (or a machining method) and the cutting apparatus 1 (which may be a machining facility). The memory 213 stores various programs including a machining assist tool program (which will be described below), and recommended machining conditions acquired by execution of the machining assist tool program. The memory 213 further stores the driving solver 230 and the solution-providing solver 240. The memory 213 outputs the driving solver 230 and the solution-providing solver 240 to the control unit 211.

The display 214 presents processing details including a response (which will be described below) acquired by execution of the machining assist tool program. The interface 215 functions as the acquirer. The interface 215 is communicably connected to the cutting apparatus 1 so as to acquire various pieces of information from the cutting apparatus 1. The database updater 216 updates various pieces of information accumulated in the knowledge database 220.

The knowledge database 220 is communicably connected to the personal computer 210. Specifically, the knowledge database 220 is communicably connected to the control unit 211 and the database updater 216. The knowledge database 220 stores various pieces of cutting-related or machining-related information (i.e., know-how) based on expertise (or knowledge) and experience gained by the skilled worker. The knowledge database 220 stores the know-how in the form of electronic data (i.e., digital data) such that the know-how is updatable.

The knowledge database 220 may be connected not only to the personal computer 210 but also to an additional personal computer via a network line (not illustrated). In such a case, the skilled worker may enter various pieces of information (i.e., know-how) into the knowledge database 220 using the receiver 212 of the personal computer 210 and a receiver (e.g., a keyboard) of the additional personal computer.

The following description specifically illustrates know-how concerning a cutting method (or a machining method) and the cutting apparatus 1 (which may be a machining facility). The know-how is accumulated in the knowledge database 220. In the following description, the term "know-how" refers to factors (or factor elements) that cause a problem in machining, the granularity of the problem and factors, a link (or correlation) between the problem and the factors, and a link (or correlation) between the factors. In one example, the term "granularity" simply denotes ranking on a scale of 1 to 5. In another example, the granularity is a range expressed as "large", "medium", and "small" or in the form of numeric values.

Figure 5:
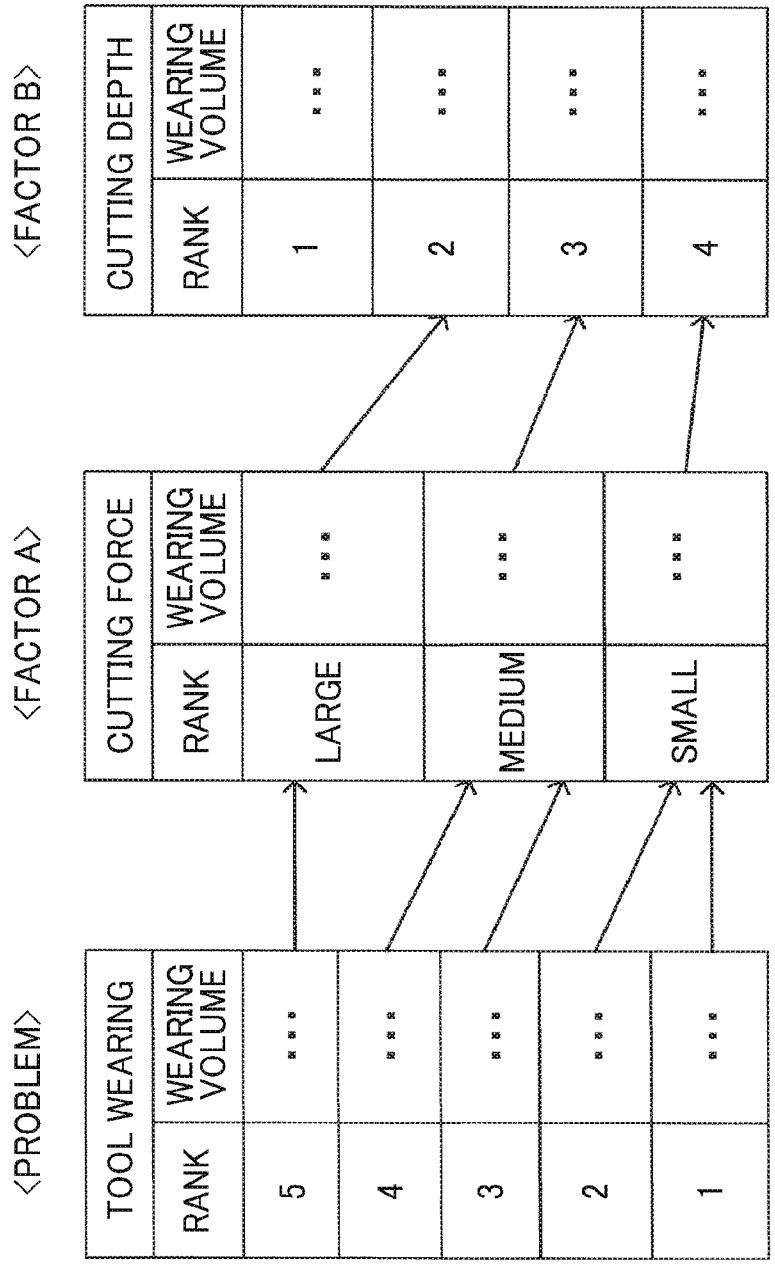
FIG. 5 is a chart describing various pieces of information stored in a knowledge database in an updatable manner.
Figure 6:
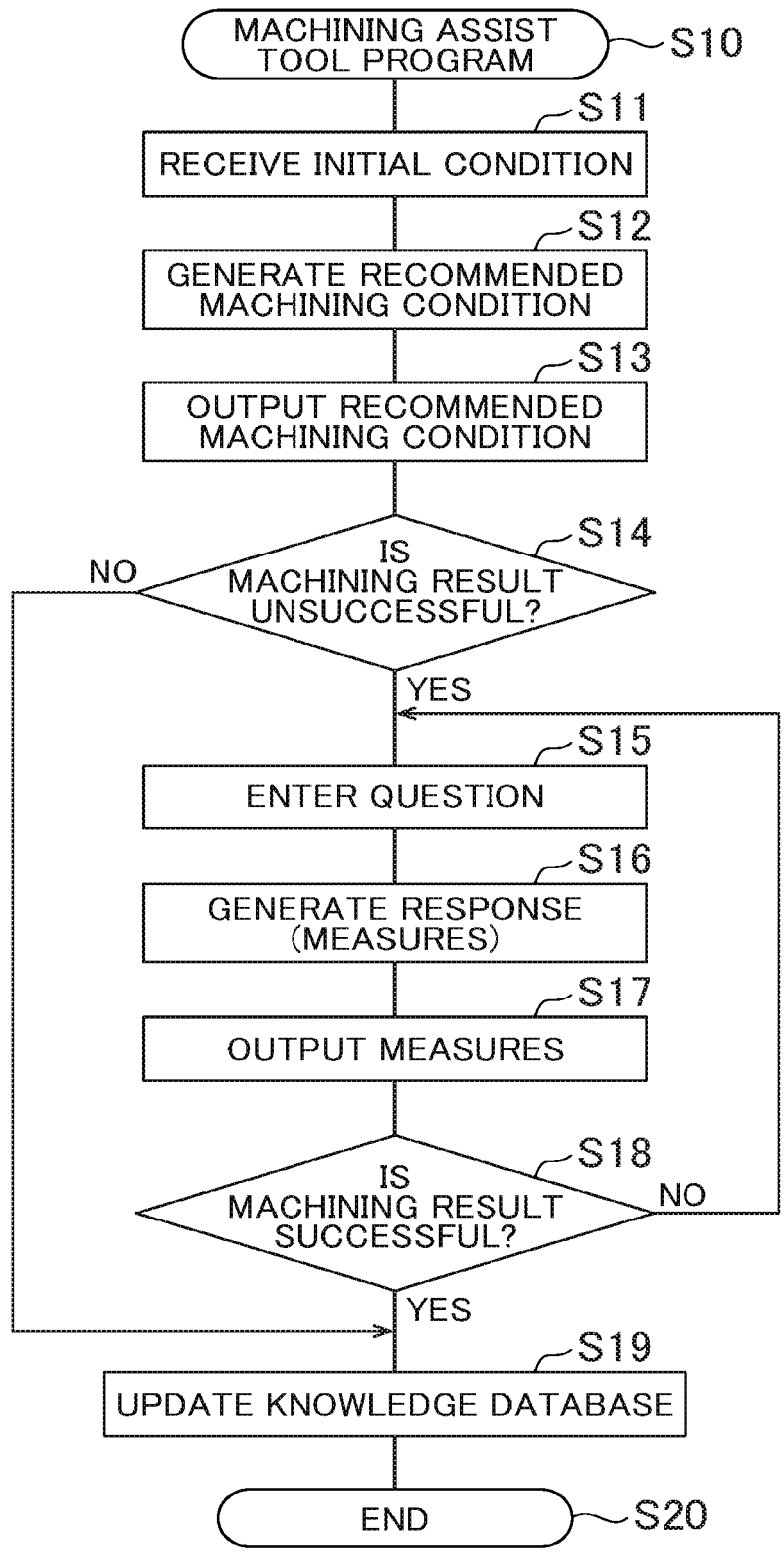
FIG. 6 is a flow chart of a machining assist tool program to be executed by a control unit illustrated in FIG. 4.

The following description illustrates a specific example where know-how to cope with a problem that has occurred in machining (e.g., significant wearing of the cutting tool 40) is accumulated (or registered) in the knowledge database 220 by the skilled worker. As illustrated in FIG. 5, the skilled worker first enters "tool wearing" for a "problem".

The skilled worker enters a "cutting force" for a factor A that is assumed to have caused "tool wearing". The skilled worker enters a "cutting depth" for a "factor B" that is assumed to have caused "tool wearing". The number of factors is not limited to two. Alternatively, the number of factors may be three or more. In such a case, the skilled worker may naturally enter, for example, "cutting heat", "chemical wearing", "cutting speed", "feed rate", and "tool material".

As illustrated in FIG. 5, the skilled worker enters, for example, a numeric range (e.g., a wearing volume) in the form of the "granularity" of the "problem", and enters a "rank" expressed on a scale of 1 to 5 such that the numeric value indicating the "rank" will be greater as the numeric range (e.g., the wearing volume) increases. The skilled worker enters, for example, a numeric range (e.g., a cutting force) in the form of the "granularity" of the "factor A", and enters a "range" expressed as "large", "medium", and "small" or in the form of numeric values responsive to a reduction in the numeric range (e.g., the cutting force). The skilled worker enters, for example, a numeric range (e.g., a cutting depth) in the form of the "granularity" of the "factor B", and enters a "rank" on a scale of 1 to 4 such that the numeric value indicating the "rank" will be greater as the numeric range (e.g., the cutting depth) increases. In this example, the "rank" and the "range" may be related to each other (or associated with each other) using, for example, numeric values. Thus, when the skilled worker enters the "rank", the "range" associated with the "rank" is also entered, and when the skilled worker enters the "range", the "rank" associated with the "range" is also entered. In other words, the "rank" and the "range" are linkable to each other.

As indicated by the arrows in FIG. 5, the skilled worker enters a link (or correlation) between the "problem" and the "factor A", and enters a link (or correlation) between the "factor A" and the "factor B". Specifically, the skilled worker knows from his or her experience that there is the correlation that "tool wearing" will increase when cutting is carried out with a large "cutting force" and a great "cutting depth".

Based on this experience (i.e., based on this correlation), the skilled worker enters, as illustrated in FIG. 5, the link between the rank "5" indicating that "tool wearing" for the "problem" is significantly large and the range "large" indicating that the "cutting force" for the "factor A" is large. In addition, the skilled worker enters the link between the range "large" indicating that the "cutting force" for the "factor A" is large and the rank "2" indicating that the "cutting depth" for the "factor B" is relatively large.

The skilled worker enters the links between the ranks "4" and "3" indicating that "tool wearing" for the "problem" is relatively large and the range "medium" indicating that the "cutting force" for the "factor A" is relatively large. In addition, the skilled worker enters the link between the range "medium" indicating that the "cutting force" for the "factor A" is relatively large and the rank "3" indicating that the "cutting depth" for the "factor B" is large.

The skilled worker enters the links between the ranks "2" and "1" indicating that "tool wearing" for the "problem" is relatively small and the range "small" indicating that the "cutting force" for the "factor A" is small. In addition, the skilled worker enters the link between the range "small" indicating that the "cutting force" for the "factor A" is small and the rank "4" indicating that the "cutting depth" for the "factor B" is considerably large.

Factors found (or determined) to have caused problems and links (or correlations) established between the factors so as to find solutions to the problems are thus stored (or registered) in the knowledge database 220 by the skilled worker such that the factors and links (or correlations) are stored (or registered) in the form of know-how converted into electronic data (i.e., digital data). For example, in the case where the need for an increase of the planarity of the workpiece W is considered as "problem" to be solved, factors found (or determined) to have reduced the planarity of the workpiece W and links (or correlations) established between the factors so as to find a way to increase the planarity of the workpiece W may be stored (or registered) in the knowledge database 220 by the skilled worker such that the factors and links (or correlations) are stored (or registered) in the form of know-how converted into electronic data (i e, digital data).

Referring again to FIG. 4, the driving solver 230 (i.e., the first solver) is executed by the control unit 211 so as to search for various pieces of cutting-related information stored and accumulated in the knowledge database 220, thus deriving a search process and a search route (which will be described below) in the form of a first solution. The solution-providing solver 240 (i.e., the second solver) is executed by the control unit 211 so as to generate search condition(s) in accordance with, for example, a question entered by the unskilled worker and output the search condition(s) to the driving solver 230. In accordance with progress information acquired from the driving solver 230, the solution-providing solver 240 generates a response to, for example, the question entered by the unskilled worker and presents the response on the display 214 in the form of a second solution.

The control unit 211 thus executes the driving solver 230 and the solution-providing solver 240 such that the driving solver 230 and the solution-providing solver 240 cooperate with each other as the solver. This causes the driving solver 230 to search the knowledge database 220 in accordance with the search condition(s) generated by the solution-providing solver 240. The driving solver 230 extracts information (i.e., factors) associated with machining conditions concerning cutting (or machining) and a question about the result of machining performed on the workpiece W. The machining conditions and the questions entered by the unskilled worker will hereinafter be referred to as an "unskilled worker's question or other message". In other words, the driving solver 230 extracts information (i.e., factors) that will be included in a response to the unskilled worker's question or other message.

The solution-providing solver 240 generates a response to the unskilled worker's question or other message in accordance with the information (i.e., factors) extracted by the driving solver 230. The solution-providing solver 240 generates the response that includes a search process (including factors considered in the generation of the response) and a search route (indicating a link or correlation between the factors). In the following description, a combination of a search process and a search route may be referred to as "progress information".

The control unit 211 of the personal computer 210 executes the driving solver 230 and the solution-providing solver 240 so as to generate measures (which will be described below) and generate a search process and a search route (i.e., progress information). The control unit 211 then presents a response (including the measures and progress information generated) on the display 214 so as to make a suggestion to the unskilled worker. This machining assist operation will be described in detail below with reference to FIGS. 6 to 9.

In the following description, the term "control unit 211" may refer to the CPU included in the control unit 211. In step S10, the control unit 211 of the personal computer 210 starts the machining assist tool program illustrated in FIG. 6. In step S11, the control unit 211 receives cutting-related (or machining-related) initial conditions.

Figure 7:
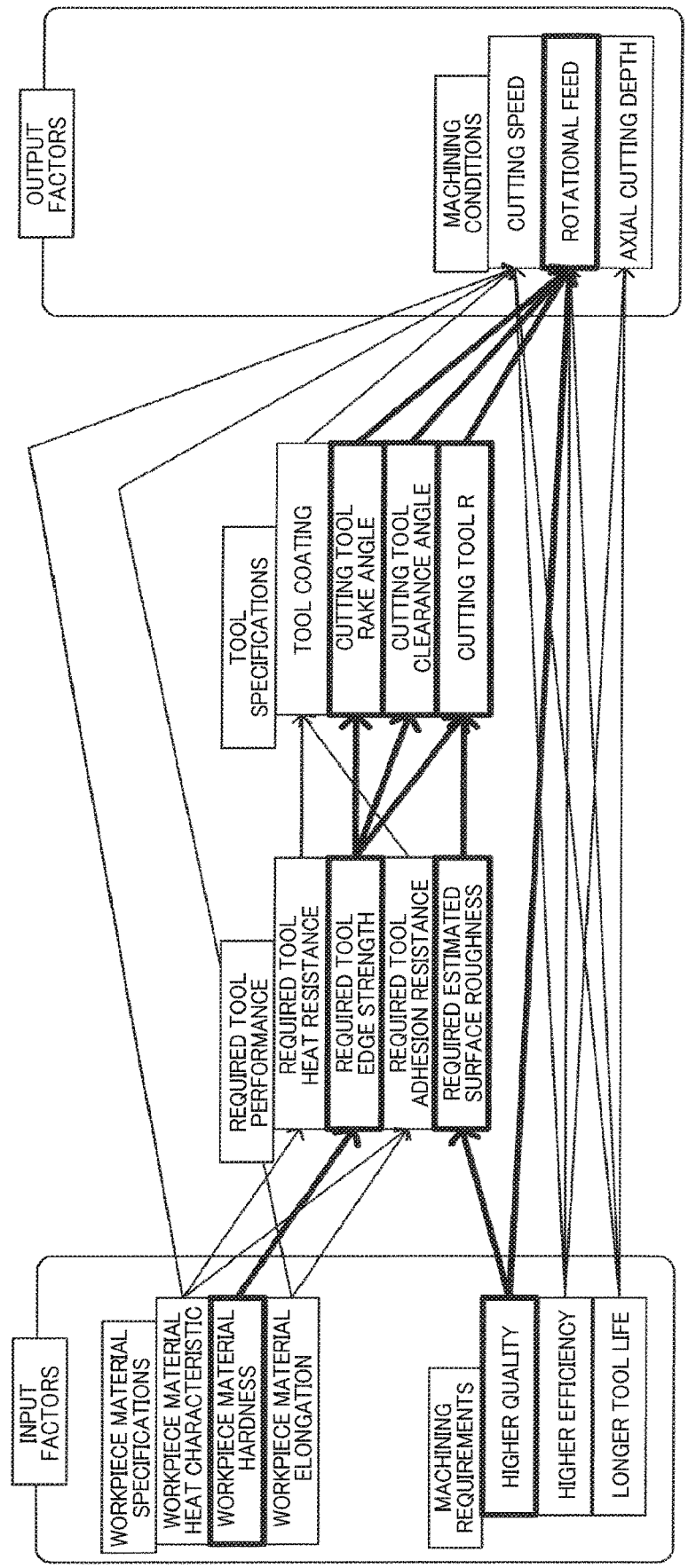
FIG. 7 is a diagram describing how the control unit illustrated in FIG. 4 sets recommended machining conditions.

The initial conditions are entered by the unskilled worker through the receiver 212. As illustrated in FIG. 7, examples of the initial conditions include specifications of workpiece material(s) for the workpiece W (such as workpiece material heat characteristic, workpiece material hardness, and workpiece material elongation), and machining requirements for the workpiece W (such as higher quality, higher efficiency, and longer tool life). In one example, the workpiece material specifications, such as workpiece material hardness, are accumulated (or registered) in the knowledge database 220 such that the workpiece material specifications are expressed in terms of the "rank" or "range" similarly to the "factor A" and "factor B" mentioned above. Upon receiving the initial conditions, the control unit 211 moves the program to step S12.

Refer again to FIG. 6. In step S12, the control unit 211 reads and executes the driving solver 230 and the solution-providing solver 240 stored in the memory 213. This causes the driving solver 230 and the solution-providing solver 240 to cooperate with each other so as to generate recommended machining conditions. Specifically, the driving solver 230 searches the knowledge database 220 using, as search conditions, the initial conditions received in step S11. The driving solver 230 thus extracts factors in the form of the first solution and then outputs the factors to the solution-providing solver 240.

Using the factors received from the driving solver 230 (i.e., the know-how entered by the skilled worker), the solution-providing solver 240 generates recommended machining conditions in the form of the second solution. Upon generating the recommended machining conditions by executing the driving solver 230 and the solution-providing solver 240, the control unit 211 moves the program to step S13. The generation of recommended machining conditions will be described in detail below.

Figure 8:
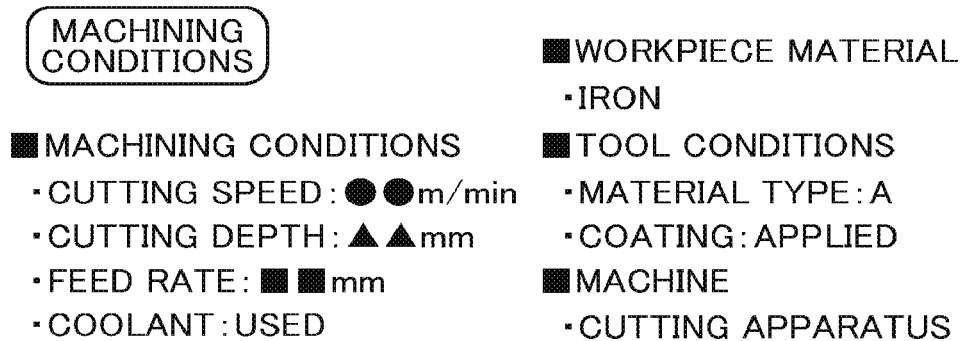
FIG. 8 is a chart describing the recommended machining conditions set by the control unit illustrated in FIG. 4.

In step S13, the control unit 211 outputs the recommended machining conditions generated in step S12. Specifically, the control unit 211 outputs the generated recommended machining conditions to the display 214. Thus, as illustrated in FIG. 8, the display 214 presents the output recommended machining conditions so as to suggest the recommended machining conditions to the unskilled worker. The control unit 211 stores the recommended machining conditions (which are generated and suggested to the unskilled worker) in the memory 213.

The unskilled worker enters the recommended machining conditions, presented on the display 214, into the machining condition receiver 140 included in the controller 100 of the cutting apparatus 1. In accordance with the recommended machining conditions entered into the machining condition receiver 140, the controller 100 operates the rotative spindle motor 15, the X-axis driver 22, and the Z-axis driver 32, so that the cutting apparatus 1 cuts the workpiece W.

In the present embodiment, the recommended machining conditions are generated and suggested to the unskilled worker in accordance with various pieces of information stored in the knowledge database 220 (i.e., the know-how entered into the knowledge database 220 by the skilled worker). This enables the unskilled worker to check how the recommended machining conditions are set in order to meet the "workpiece material specifications" and "machining requirements" that the unskilled worker has entered. Specifically, the unskilled worker is able to check factors stored in the knowledge database 220 and correlation(s) between the factors (i.e., a search process and a search route).

The following description discusses in detail how the unskilled worker checks a search process and a search route. As indicated by the associated thick continuous lines in FIG. 7, the "workpiece material hardness" is selected from the "workpiece material specifications" entered in the form of initial conditions by the unskilled worker, and the "rotational feed" is selected from the recommended machining conditions. In this case, factors (included in a search process) that associate the "workpiece material hardness" with the "rotational feed" and a correlation between the factors (which is indicated by a search route) are suggested to the unskilled worker. In FIG. 7, the search process is surrounded by the associated thick continuous lines, and the search route is indicated by the associated thick continuous lines.

The machining assist system 200 is thus able to indicate a search process (including factors extracted by the driving solver 230) and a search route (indicating a correlation between the factors included in the search process) to the unskilled worker. Accordingly, the unskilled worker is able to easily understand why the "rotational feed" needs to be reduced when the "workpiece material hardness" is high.

As illustrated in FIG. 7, when an input factor is the "workpiece material hardness", the "required tool edge strength" included in the "required tool performance" needs to be provided. Providing the "required tool edge strength" makes it necessary to maintain the "cutting tool rake angle", the "cutting tool clearance angle", and the "cutting tool R" (which are included in the "tool specifications") at suitable levels during cutting. Accordingly, the unskilled worker is able to understand that the machining assist system 200 provides an output factor (i.e., a machining condition) requiring a reduction in the "rotational feed" in order to maintain these "tool specifications" at suitable levels.

As illustrated in FIG. 7, achieving "higher quality" that is an input factor makes it necessary to provide the "required estimated surface roughness" included in the "required tool performance". Providing the "required estimated surface roughness" makes it necessary to maintain the "cutting tool R" included in the "tool specifications" at a suitable level during cutting.

Accordingly, the unskilled worker is able to understand that the machining assist system 200 provides an output factor (i e, a machining condition) requiring a reduction in the "rotational feed" in order to maintain the "cutting tool R" at a suitable level. The unskilled worker is also able to directly understand that the "rotational feed" included in the machining conditions needs to be reduced in order to achieve "higher quality".

As described above, the machining assist system 200 is able to indicate factors (included in a search process between an input factor and an output factor) and a search route (indicating a link or correlation between the factors) to the unskilled worker. The unskilled worker is thus able to easily learn factors to be considered and a link (or correlation) between the factors when setting machining conditions for cutting the workpiece W into a desired shape.

The search process and the search route to be indicated to the unskilled worker are based on the know-how entered by the skilled worker. Accordingly, the unskilled worker will acquire the know-how by learning factors to be considered and a link (or correlation) between the factors.

The unskilled worker determines finished quality (e.g., shape, planarity) of the workpiece W, cut in accordance with the recommended machining conditions, so as to obtain a machining result indicative of whether machining is successful. The unskilled worker enters the machining result indicative of whether machining is successful (which may hereinafter be referred to as "machining result information") into the control unit 211 through the receiver 212. The unskilled worker does not necessarily have to enter the machining result indicative of whether machining is successful (i.e., machining result information) into the control unit 211. In an alternative example, a measuring device (not illustrated) may be connected between the interface 215 of the personal computer 210 and the controller 100 of the cutting apparatus 1. In this example, measurement information may be provided from the measuring device to the control unit 211 through the interface 215 such that machining result information is automatically provided to the control unit 211.

In step S14 of the machining assist tool program, the control unit 211 determines whether the machining result entered as mentioned above indicates that machining is unsuccessful. When the machining result (which is machining result information entered by the unskilled worker) indicates that machining is unsuccessful (i.e., when the answer is "Yes" in step S14), the control unit 211 carries out the processes of step S15 and subsequent steps.

When the machining result (which is machining result information entered by the unskilled worker) indicates that machining is successful (i.e., when the answer is "No" in step S14), the control unit 211 moves the program to step S19. In step S19, the control unit 211 updates the information stored in the knowledge database 220 as will be described below.

Upon determining in step S14 that the machining result is unsuccessful, the control unit 211 carries out the process of step S15. In step S15, the control unit 211 prompts the unskilled worker to enter a question about a problem to be solved (or a task to be achieved) so that the machining result of the workpiece W, cut in accordance with the recommended machining conditions, will be successful or a question about a problem (or a task) that has occurred in the cutting apparatus 1.

Specifically, the control unit 211 causes the display 214 to present a screen that enables the unskilled worker to enter the question. For example, in the case where the result of cutting conducted in accordance with the recommended machining conditions indicates significant wearing of the cutting tool 40, the unskilled worker enters the unskilled worker's question or other message "tool wearing is significant" through the receiver 212 in response to the screen presented on the display 214.

Upon receiving the unskilled worker's question or other message in step S15, the control unit 211 generates, in step S16, measures included in a response to the unskilled worker's question or other message entered in step S15. Specifically, the control unit 211 reads and executes the driving solver 230 and the solution-providing solver 240 stored in the memory 213.

In response to this, the solution-providing solver 240 outputs the unskilled worker's question or other message in the form of a search condition to the driving solver 230 that cooperates with the solution-providing solver 240. In accordance with the search condition received from the solution-providing solver 240, the driving solver 230 searches the knowledge database 220 so as to acquire factors (included in a search process), a search route indicating a correlation between the factors, and measures. The search process, search route, and measures acquired are output to the solution-providing solver 240. Upon outputting the search process, search route, and measures to the solution-providing solver 240, the control unit 211 moves the program to step S17.

In step S17, the control unit 211 causes the display 214 to present the search process and search route acquired by the solution-providing solver 240. The search process and search route are presented in the form of a response to the unskilled worker's question or other message (e.g., the message "tool wearing is significant"). In step S17, the control unit 211 also causes the display 214 to present the measures in such a manner that certainty factors (i.e., priorities), indicative of the likelihood of providing an answer to the question, are assigned to the measures. The following description discusses these processes in more detail.

Figure 9:
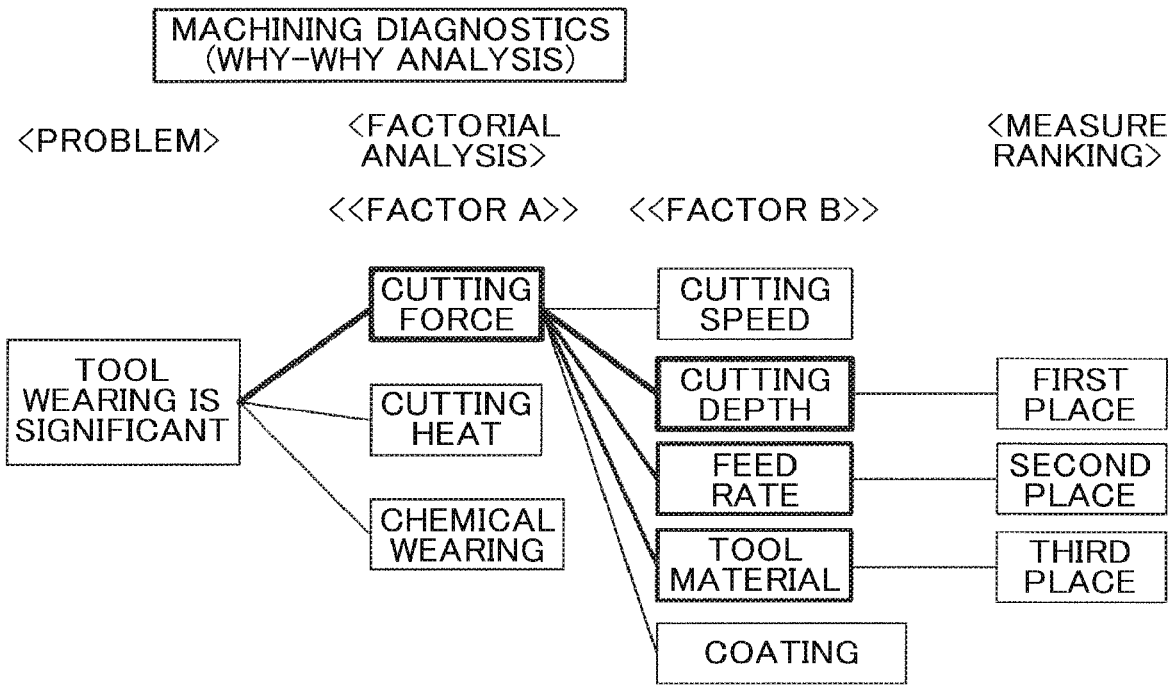
FIG. 9 is a chart describing progress information and certainty factors (priorities) included in a response generated by the control unit illustrated in FIG. 4.

As illustrated in FIG. 9, the control unit 211 causes the display 214 to present a "machining diagnostics (why-why analysis)" in the form of a response to the unskilled worker's question or other message. The response presented on the display 214 and suggested to the unskilled worker includes: a "problem" associated with the unskilled worker's question or other message; "measure ranking" indicating priorities assigned to measures such that the measures are prioritized in descending order of certainty factor; and a "factorial analysis". The "factorial analysis" includes: the "factor A" and "factor B" (i.e., factors included in a search process) to be used to find a solution to the "problem"; and a link (or a search route) indicative of a correlation between these factors. In FIG. 9, the search process is surrounded by the associated thick continuous lines, and the search route is indicated by the associated thick continuous lines.

In the example illustrated in FIG. 9, the driving solver 230 searches the knowledge database 220 (see FIG. 5) so as to determine the "cutting force" (i.e., the "factor A") and the "cutting depth" (i.e., the "factor B") in the form of the first solution to the "problem" (i.e., the problem that "tool wearing is significant"). The driving solver 230 also determines "ranks" or "ranges" assigned to the "problem", the "factor A", and the "factor B" and link(s) or correlation(s) based on the "ranks" or "ranges" in the form of the first solution.

The solution-providing solver 240 conducts a factorial analysis on the "factor A" and "factor B", determined by the driving solver 230, in accordance with the link(s) or correlation(s) between these factors. For the correlation(s), the solution-providing solver 240 may use a known method that involves converting, for example, the "ranks" or "ranges" into scores and conducting a factorial analysis in consideration of the scores. In accordance with certainty factors indicating the certainty of the link(s) or correlation(s) between the factors to be used to find a solution to the "problem", the solution-providing solver 240 determines the "measure ranking" that serves as the second solution.

In the example illustrated in FIG. 9, the solution of the "problem" that "tool wearing is significant" requires that the certainty factor of the "cutting force" (which is the "factor A") should be high, and the "cutting depth", the "feed rate", and the "tool material" (each of which is the "factor B" highly correlated with the "factor A") should have the following relationship in terms of certainty factor: "cutting depth">"feed rate">"tool material". Accordingly, the "measure ranking" will be as follows. Because the correlation between the "cutting force" and the "cutting depth" has the highest certainty factor, the correlation between the "cutting force" and the "cutting depth" is ranked in the "first place", the correlation between the "cutting force" and the "feed rate" is ranked in the "second place", and the correlation between the "cutting force" and the "tool material" is ranked in the "third place".

As illustrated in FIG. 10, the control unit 211 presents, on the display 214, a response to the "problem" that "tool wearing is significant" (i.e., measures to deal with the problem that "tool wearing is significant") in the form of the second solution derived by the solution-providing solver 240. Specifically, the control unit 211 presents, on the display 214, the measures in accordance with the "measure ranking" described above. The control unit 211 thus suggests (or recommends) the measures to the unskilled worker. In the example illustrated in FIG. 10, the display 214 presents "suggestions for remedial measures" in the form of a response such that three measures are suggested (or recommended) to the unskilled worker.

Upon finding a direct cause for the "problem" that "tool wearing is significant", the control unit 211 suggests a measure to deal with the direct cause to the unskilled worker. Upon finding no direct cause for the "problem", the control unit 211 finds a cause assumed to be close to the direct cause for the "problem" and suggests (or recommends) a measure to deal with the assumed cause to the unskilled worker. In other words, the control unit 211 functions as a "recommender" to recommend a measure to deal with the assumed cause to the unskilled worker.

The measures suggested (or recommended) to the unskilled worker in the example illustrated in FIG. 10 will be described below. For a machining condition associated with the correlation between the "cutting force" and the "cutting depth" ranked in the first place in the above-mentioned "measure ranking", the control unit 211 suggests (or recommends) reducing the cutting depth by X percent. For a machining condition associated with the correlation between the "cutting force" and the "feed rate" ranked in the second place in the "measure ranking", the control unit 211 suggests (or recommends) reducing the feed rate by Y percent. For a tool condition associated with the correlation between the "cutting force" and the "tool material" ranked in the third place in the "measure ranking", the control unit 211 suggests (or recommends) changing a material for the cutting tool 40 from a material A to a material B.

When generating the response, the driving solver 230 and the solution-providing solver 240 operate as follows. The driving solver 230 searches the knowledge database 220 so as to acquire progress information indicative of a search process (including the "factor A" and the "factor B" determined by the driving solver 230) and a search route (indicating a correlation between the "factor A" and the "factor B"). The solver driving solver 230 outputs the progress information to the solution-providing solver 240. The solution-providing solver 240 acquires information stored in the memory 213 and associated with the "factor A" and "factor B". In accordance with the information acquired, the solution-providing solver 240 generates the response that suggests reducing the cutting depth, reducing the feed rate, and changing the tool material in the form of the measures. Accordingly, the measures suggested to the unskilled worker are based on expertise (or knowledge) and experience of the skilled worker (i.e., know-how acquired by the skilled worker). As illustrated in FIG. 10, suggesting the measures to deal with the unskilled worker's question or other message involves additionally presenting general precautions to the unskilled worker so as to prompt the unskilled worker to exercise caution.

When the measures are suggested to the unskilled worker in step S17, the unskilled worker changes the recommended machining conditions in accordance with the measures in a sequence starting from the "first place", for example, and enters the changed recommended machining conditions into the machining condition receiver 140 of the controller 100. The unskilled worker cuts the workpiece W in accordance with the recommended machining conditions changed in response to the measures, determines the finished quality (e.g., shape, planarity) of the workpiece W, and determines the wearing state of the cutting tool 40.

The unskilled worker enters a machining result indicative of whether machining is successful into the control unit 211 through the receiver 212. The machining result includes the wearing state of the cutting tool 40. When a measuring device (not illustrated) is connected between the interface 215 of the personal computer 210 and the controller 100 of the cutting apparatus 1, the machining result information may be automatically provided from the measuring device to the control unit 211.

In step S18 of the machining assist tool program, the control unit 211 determines whether the machining result entered by the unskilled worker is successful. When the result of machining (which is conducted in accordance with the recommended machining conditions changed in response to at least one or all of the measures) is successful, the control unit 211 determines that the answer is "Yes" in step S18 and moves the program to step S19. When the unskilled worker enters information indicating that the machining result is successful, the unskilled worker also enters the suggested measure(s) that contribute(s) to the solution of the "problem" or ranking for contribution of the measures. The ranking for contribution of the measures will hereinafter be referred to as "contribution information". Examples of the contribution information include numbers assigned to the "measures" illustrated in FIG. 10.

When the result of machining (which is conducted in accordance with the recommended machining conditions changed in response to all of the measures) is unsuccessful, the control unit 211 determines that the answer is "No" in step S18 and returns the program to step S15 so as to carry out the processes of step S15 and the subsequent steps. This means that the unskilled worker enters an unskilled worker's question or other message again so as to receive suggestions about measures. The control unit 211 repeats the processes of steps S15, S16, S17, and S18 until the unskilled worker determines in step S18 that the result of machining (which is conducted in accordance with the recommended machining conditions changed in response to the measures suggested) is successful.

In step S19, the information stored in the knowledge database 220 is updated by the control unit 211 in accordance with the recommended machining conditions reflective of the successful machining result. Specifically, upon determining in step S14 that the machining result is successful, the control unit 211 determines that the recommended machining conditions suggested first are non-defective product conditions for cutting the workpiece W so as to provide a non-defective product. In this case, the control unit 211 cooperates with the database updater 216 in changing, for example, the "ranks" and "ranges" and storing the resulting "ranks" and "ranges", such that these recommended machining conditions are suggested preferentially for the subsequent search, e.g., such that there is an increase in the certainty factor of each factor (included in a search process) for which the driving solver 230 searches so as to set these recommended machining conditions (i.e., non-defective product conditions).

Upon determining in step S18 that the machining result is successful, the control unit 211 cooperates with the database updater 216 so as to change, for example, the "priorities" of the measures in response to the contribution information, such that the measures contributory to the solution of the "problem" are preferentially suggested to the unskilled worker in accordance with the contribution information entered by the unskilled worker. In an alternative example, the control unit 211 cooperates with the database updater 216 so as to make changes such that the measures contributory to the solution of the "problem" are preferentially suggested to the unskilled worker, e.g., such that there is an increase in the certainty factor of each factor (included in a search process) for which the driving solver 230 searches to set the measures. Thus, information obtained during actual machining conducted by the unskilled worker is fed back to the various pieces of information stored in the knowledge database 220 (i.e., the know-how entered into the knowledge database 220 by the skilled worker). This enhances accuracy of the recommended machining conditions and accuracy of the measures suggested in response to the unskilled worker's question or other message.

Upon updating the knowledge database 220 in step S19, the control unit 211 moves the program to step S20. In step S20, the control unit 211 ends the execution of the machining assist tool program. After a lapse of a predetermined period of time, the control unit 211 starts execution of the machining assist tool program in step S10 again.

As is clear from the above description, the machining assist system 200 according to the above-described embodiment includes the knowledge database 220, the receiver 212, the interface 215, the control unit 211, and the display 214. The knowledge database 220 serves as a database to store various pieces of information indicative of know-how concerning a machining method and a machining facility, such that these pieces of information are searchable and updatable. The receiver 212 and the interface 215 serve as an acquirer to acquire machining result information indicative of a machining result of machining (e.g., cutting) performed on the workpiece W. The receiver 212 serves as a question receiver to receive an unskilled worker's question or other message in accordance with the machining result information acquired by the receiver 212 and the interface 215. The unskilled worker's question or other message is a question about the machining method and the machining facility. The control unit 211 executes the driving solver 230 and the solution-providing solver 240 that serve as a solver to search the knowledge database 220 by setting a search condition based on at least the unskilled worker's question or other message received by the receiver 212 and derive a solution responsive to the search condition. The solution is derived in the form of a response to the question. The display 214 presents the response acquired in response to the execution of the solver (including the driving solver 230 and the solution-providing solver 240) by the control unit 211. The response presented on the display 214 includes: measures each related to an answer to the question; priorities corresponding to certainty factors of the measures each indicative of the likelihood of providing an answer to the question; and progress information indicative of a search process and a search route. The search process includes factors for which the solver (including the driving solver 230 and the solution-providing solver 240) searches the knowledge database 220 so as to derive the measures in the form of the solution. The search route indicates a correlation between the factors included in the search process. The search process and the search route are visually presented.

The cutting apparatus 1 includes the machining assist system 200, the tool retainer 30, the workpiece retainer 10, the workpiece conveyor 20, the Z-axis driver 32, and the controller 100. The tool retainer 30 retains the cutting tool 40. The cutting tool 40 is a tool including a cutting edge 45. The workpiece retainer 10 retains the workpiece W. The workpiece conveyor 20 conveys the workpiece W retained by the workpiece retainer 10 in the X-axis direction. The X-axis direction is a predetermined direction. The Z-axis driver 32 is a tool mover to move the cutting tool 40 relative to the workpiece W. The controller 100 controls operation of the Z-axis driver 32.

The solver to be executed by the control unit 211 includes the driving solver 230 and the solution-providing solver 240. The driving solver 230 is the first solver to search the knowledge database 220 in accordance with the search condition received and derive at least the recommended machining conditions in the form of a first solution responsive to the search condition. The solution-providing solver 240 is the second solver to set the search condition in accordance with at least the question (e.g., the unskilled worker's question or other message) and the machining result information and cooperate with the driving solver 230 so as to derive the response in the form of a second solution.

Upon receiving the question (e.g., the unskilled worker's question or other message) concerning the machining method (or cutting method) and the machining facility (e.g., the cutting apparatus 1) through the receiver 212, the control unit 211 of the machining assist system 200 is able to search the knowledge database 220 (in which the various pieces of information indicative of the know-how are stored in an searchable and updatable manner) by setting the search condition based on the question (e.g., the unskilled worker's question or other message) received. The control unit 211 is able to present, on the display 214, the measures each related to an answer to the question (e.g., the unskilled worker's question or other message), the certainty factor (or priority) of each of the measures, and the progress information indicative of the search process (including the factors) and the search route (indicating the correlation between the factors), such that the measures, the certainty factor, and the progress information are indicated (or suggested) to the unskilled worker.

The present embodiment thus enables, for example, the unskilled worker who lacks expertise (or knowledge) and experience in machining (or cutting) to find an answer to the question (e.g., the unskilled worker's question or other message) concerning the machining method (or cutting method) and the machining facility (e.g., the cutting apparatus 1) in accordance with the response suggested to the unskilled worker. This reduces the frequency of asking the skilled worker for help and accordingly reduces the frequency of interrupting the work of the skilled worker. Consequently, the present embodiment prevents or limits a reduction in productivity of the skilled worker.

The various pieces of information are stored in the knowledge database 220 in the form of the know-how acquired by the skilled worker who has abundant expertise (or knowledge) and experience in machining (or cutting). Thus, if the skilled worker retires, his or her valuable know-how would be permanently storable and usable. This makes it possible to continuously pass the valuable know-how on to workers of the next generation. The response indicated to the unskilled worker includes the progress information. The unskilled worker is thus able to learn the factors for acquiring the measures indicated and the correlation between the factors (i.e., ways of thinking in factorial analysis).

The control unit 211 is able to execute the solver (including the driving solver 230 and the solution-providing solver 240) so as to search the knowledge database 220 using, as search conditions, initial conditions indicative of machining requirements for the workpiece W and generate recommended machining conditions for machining the workpiece W using the machining method and the machining facility. The recommended machining conditions are generated in the form of the solution responsive to the search conditions.

The unskilled worker is thus able to conduct suitable cutting (or machining) on the workpiece W using the cutting apparatus 1 in accordance with the recommended machining conditions based on the know-how. This makes it unnecessary for the unskilled worker to ask the skilled worker about machining conditions in conducting cutting (or machining). Consequently, the present embodiment makes it possible not only to prevent or limit a reduction in productivity of the skilled worker but also to pass the know-how to the unskilled worker.

The machining assist system 200 may include the memory 213 to store at least recommended machining conditions included in various pieces of preset information related to the machining method and the machining facility. Storing at least the recommended machining conditions in the memory 213 makes it possible to quickly indicate the recommended machining conditions in response to, for example, the same machining requirement(s) entered.

The interface 215 is able to acquire the state of machining performed on the workpiece W using the cutting method or measurement information obtained by measuring the operating state of the cutting apparatus 1. This makes it unnecessary for the unskilled worker to enter, for example, the state of machining on the workpiece W or the operating state of the cutting apparatus 1 on an as-needed basis. Consequently, the present embodiment simplifies operations to be performed by the unskilled worker.

The machining assist system 200 may include the database updater 216 to update the various pieces of information in the knowledge database 220 in response to the machining result information acquired by the receiver 212 or the interface 215. Specifically, the database updater 216 is able to update the various pieces of information in the knowledge database 220 using at least the response.

The various pieces of information (i.e., the know-how) stored in the knowledge database 220 are constantly updatable in response to an actual machining result obtained in accordance with, for example, the recommended machining conditions or a machining result obtained by performing machining in accordance with the response. The control unit 211 is thus able to indicate (or suggest) a suitable response with constant high accuracy for an unskilled worker's question or other message. The suitable response includes a measure having a high certainty factor.

The measures included in the response are presented on the display 214, with priorities assigned to the measures such that the measures are prioritized in descending order of certainty factor.

The unskilled worker is thus able to efficiently carry out the measures by following the priorities presented on the display 214. The unskilled worker is also able to easily understand the most effective measure included in the measures. This makes it unnecessary to ask the skilled worker about the effectiveness of the measures. Consequently, the present embodiment prevents or limits a reduction in productivity of the skilled worker.

The invention is not limited to the above embodiment, and may be practiced in other embodiments. Various changes and modifications may be made to the invention without departing from the scope of the invention.

In the foregoing embodiment, the skilled worker enters the various pieces of information (i.e., the know-how), based on his or her expertise (or knowledge) and experience, into the knowledge database 220 using the personal computer 210. In an alternative example, information written in a report or other documents created by the skilled worker in the past may be converted into electronic data with, for example, an optical character reader (OCR), and factors included in the report or other documents converted into electronic data may be extracted and stored in the knowledge database 220 in an updatable manner.

In this alternative example, the personal computer 210 may automatically extract the factors using, for example, a preset keyword and a keyword producible from the various pieces of information stored in the knowledge database 220 by natural language processing technique and machine learning technique. This considerably reduces the load on the skilled worker.

In the foregoing embodiment, creation of the knowledge database 220 requires data entry operations performed by the unskilled worker and the skilled worker. In an alternative example, the machining assist system 200 may be provided with a machine learning unit 221 as indicated by the dashed lines in FIG. 4. The machine learning unit 221 uses a known machine learning technique (or more specifically, executes a machine learning program). In accordance with a known method, the machine learning unit 221 analyzes, for example, machining conditions concerning configuration and operation of the cutting apparatus 1, machining information including actual measurement data obtained from the above-mentioned measuring device or other device, information including the search process and search route mentioned above, and information concerning adjusting operation prior to cutting. The machine learning unit 221 may thus be able to create the knowledge database 220.

The machine learning unit 221 learns a training data set that includes, for example, machining conditions for machining the workpiece W (which include recommended machining conditions), the state of machining on the workpiece W, the operating state of the cutting apparatus 1, and machining result information. This makes it possible to increase the amount of various information systematized and accumulated in the knowledge database 220 (i.e., the amount of digitized know-how). Consequently, the machine learning unit 221 enhances accuracy of recommended machining conditions and measures to be suggested to the unskilled worker.

In the foregoing embodiment, the driving solver 230 and the solution-providing solver 240 are stored in the memory 213 of the personal computer 210. In an alternative example, the driving solver 230 and the solution-providing solver 240 may be stored in the knowledge database 220. Also in this example, the control unit 211 is able to read the driving solver 230 and the solution-providing solver 240 from the knowledge database 220 so as to execute the driving solver 230 and the solution-providing solver 240. In another alternative example, a control unit different from the control unit 211 that controls the knowledge database 220 may execute the driving solver 230 and the solution-providing solver 240 in the knowledge database 220. In this example, the control unit 211 acquires progress information including a search process and a search route from the knowledge database 220 when executing the machining assist tool program.

In the foregoing embodiment, the control unit 211 executes the driving solver 230 and the solution-providing solver 240 so as to generate the recommended machining conditions in accordance with the various pieces of information (i.e., the know-how) accumulated in the knowledge database 220. Alternatively or additionally, machining conditions and other conditions (i.e., various set information) disclosed by, for example, a tool manufacturer may be stored in advance in the memory 213, such that the control unit 211 is able to suggest the recommended machining conditions to the unskilled worker in accordance with the machining conditions (i.e., the various set information) stored in the memory 213.

In the foregoing embodiment, the various pieces of information (i.e., the know-how) accumulated in the knowledge database 220 are text data. Alternatively or additionally, moving images and still images of, for example, the states of cutting and the works of the skilled worker may be captured, and data of the moving images and still images may be stored in the knowledge database 220 in an updatable and searchable manner. Thus, instead of or in addition to text, moving images and photographs are provided to the unskilled worker. This enables the unskilled worker to easily understand the ways of thinking of the skilled worker (i.e., the know-how acquired by the skilled worker). Consequently, the know-how is more reliably passed on to the unskilled worker.

The foregoing embodiment has been described on the assumption that machining performed in the foregoing embodiment is cutting involving using the cutting apparatus 1, and the various pieces of information stored in the knowledge database 220 are cutting-related information. Machining, however, is naturally not limited to cutting. For example, in the case where machining other than cutting, such as grinding or additive manufacturing, is to be carried out, the knowledge database 220 may be created such that various pieces of information (i.e., know-how) responsive to target machining are systematically stored in the knowledge database 220. This enables use of the machining assist system similarly to the foregoing embodiment.

In the foregoing embodiment, the knowledge database 220 is created such that the various pieces of information (i.e., the know-how) related to machining (or cutting) are systematically stored in the knowledge database 220. In other words, the foregoing embodiment involves creating the knowledge database 220 tailored to machining (or cutting). The knowledge database 220 is able to store know-how in various fields such that the know-how is converted into updatable and searchable electronic data. The driving solver 230 and the solution-providing solver 240 cooperate with each other, making it possible to suggest, to the unskilled worker, a response and progress information based on the various pieces of information stored in the knowledge database 220.

Accordingly, the machining assist system including the knowledge database 220, the driving solver 230, and the solution-providing solver 240 is naturally usable and operable in other fields. In the case where workers have not much knowledge or experience in the other fields, the use of the machining assist system makes it possible to suggest measures based on know-how to the workers similarly to the foregoing embodiment, and to suggest ways of thinking to come up with the measures to the workers. This eventually enables the workers to pass the know-how in the other fields on to other workers.

What is claimed is:

1. A machining assist system comprising:
a knowledge database configured to store various pieces of information indicative of know-how concerning a machining method and a machining facility, the various pieces of information being stored in a searchable and updatable manner, the various pieces of information including a link between a problem and factors that caused the problem and a link between the factors, and the link between the problem and the factors and the link between the factors being set using granularity;
a display; and
at least one processor configured to:
 receive an initial condition indicative of a machining requirement for a workpiece;
 execute a solver so as to search the database using, as a first search condition, the initial condition to extract factors from the database related to the initial condition;
 generate a recommended machining condition for machining the workpiece using the machining method and the machining facility in a form of a solution responsive to the first search condition based upon the factors from the database related to the initial condition;
 control the display to present a response related to the solution responsive to the first search condition, the response related to the solution responsive to the first search condition including first progress information indicative of a first search process and a first search route, the first search process including a plurality of the factors from the database related to the initial condition, the first search route indicating a correlation between the factors included in the first search process, and the first search process and the first search route being visually presented;
 acquire machining result information indicative of a machining result of machining performed on the workpiece;
 receive a question about the machining method and the machining facility in accordance with the machining result information;
 execute the solver to search the database by setting a second search condition based on at least the question to acquire factors and measures related to the question;
 derive a solution responsive to the second search condition, set based upon at least the question, based upon the factors and measures related to the question, the solution responsive to the second search condition being a response to the question; and
 control the display to present the response to the question, wherein
 the response presented on the display includes:
  a plurality of the measures each related to an answer to the question,
  a certainty factor of each of the measures, the certainty factor being indicative of a likelihood of providing the answer to the question, and
  second progress information indicative of a second search process and a second search route, the second search process including a plurality of the factors related to the question for which the solver searches the database so as to derive the measures related to the question in a form of the solution responsive to the second search condition, the second search route indicating a correlation between the factors included in the second search process, and the second search process and the second search route being visually presented in a manner that is visually distinguished from the factors, of the factors related to the question other than those that form the solution including the plurality of the factors, and their corresponding correlations.

2. The machining assist system according to claim 1, further comprising a memory configured to store at least the recommended machining condition and various pieces of preset information related to the machining method and the machining facility.

3. The machining assist system according to claim 1, wherein the at least one processor is configured to acquire a state of machining performed on the workpiece by the machining method or measurement information obtained by measuring an operating state of the machining facility.

4. The machining assist system according to claim 1, wherein
the solver includes a first solver and a second solver,
the first solver searches the database in accordance with the first search condition received and derives a first solution responsive to the first search condition, and
the second solver sets the second search condition in accordance with at least the question and the machining result information and cooperates with the first solver so as to derive the response in a form of a second solution.

5. The machining assist system according to claim 1, wherein the at least one processor is configured to update the various pieces of information stored in the database based on the machining result information.

6. The machining assist system according to claim 5, wherein the at least one processor is configured to update the various pieces of information stored in the database based on at least the machining result information on machining performed in accordance with the response to the question.

7. The machining assist system according to claim 1, wherein the at least one processor is configured to learn a training data set that includes a machining condition for machining the workpiece, a state of machining on the workpiece, an operating state of the machining facility to machine the workpiece, and the machining result information.

8. The machining assist system according to claim 1, wherein the measures included in the response to the question are presented on the display, with priorities assigned to the measures such that the measures are prioritized in descending order of the certainty factor.

9. A cutting apparatus comprising:
the machining assist system according to claim 1;
a tool retainer to retain a tool including a cutting edge;
a workpiece retainer to retain the workpiece;
a workpiece conveyor to convey the workpiece retained by the workpiece retainer in a predetermined direction;
a tool mover to move the tool relative to the workpiece; and
a controller to control operation of the tool mover.

* * * * *